United States Patent [19]
Harsigny et al.

[11] Patent Number: 5,488,442
[45] Date of Patent: Jan. 30, 1996

[54] PROGRESSIVE MULTIFOCAL OPHTHALMIC LENS

[75] Inventors: Christian Harsigny, Yerres; Christian Miege, Paris; Jean-Pierre Chauveau, Paris; Françoise Ahsbahs, Paris, all of France

[73] Assignee: Essilor International, Creteil, France

[21] Appl. No.: 154,336

[22] Filed: Nov. 18, 1993

[30] Foreign Application Priority Data

Dec. 11, 1992 [FR] France .................................. 92 14929

[51] Int. Cl.⁶ .................................................. G02C 7/06
[52] U.S. Cl. .................................................. 351/169
[58] Field of Search ................................. 351/168–172

[56] References Cited

U.S. PATENT DOCUMENTS

| | | | |
|---|---|---|---|
| 4,640,593 | 2/1987 | Shinohara | 351/169 |
| 4,946,270 | 8/1990 | Guilino et al. | 351/169 |
| 5,137,343 | 8/1992 | Kelch et al. | 351/169 |

FOREIGN PATENT DOCUMENTS

| | | |
|---|---|---|
| 0384128A3 | 8/1990 | European Pat. Off. . |
| 2206978 | 1/1989 | United Kingdom . |

Primary Examiner—Scott J. Sugarman
Attorney, Agent, or Firm—Pennie & Edmonds

[57] ABSTRACT

A progressive multifocal ophthalmic lens is provided having an aspherical surface comprising a distance vision portion, a near vision portion and an intermediate vision portion, in which the maximum mean sphere gradient value is situated in the intermediate vision portion of the principal meridian of progression of the lens, and the cylinder gradient over the whole aspherical surface of the lens is less than the product obtained by multiplying the power addition value at each point by a constant value coefficient.

15 Claims, 6 Drawing Sheets

PROGRESSIVE MULTIFOCAL OPHTHALMIC LENS

BACKGROUND OF THE INVENTION

The present invention relates to a progressive multifocal ophthalmic lens that includes an aspherical or nonspherical surface having a mean sphere and a cylinder at every point thereof and comprising a distance vision portion, a near vision portion and an intermediate vision portion therebetween.

Progressive multifocal ophthalmic lenses are now well known. They are employed for correcting presbyopia (longsightedness), and enable people wearing spectacles to look at objects over a wide range of distances without having to remove their spectacles. Such lenses typically include a distance vision portion, located at the upper part of the lens, a near vision portion at the bottom part of the lens and an intermediate portion linking the near and distance vision portions.

The front face, in other words the face directed away from the wearer of the spectacles, of progressive multifocal lenses is generally aspherical and the rear face, i.e. the face directed towards the wearer of the spectacles is toroidal or spherical in shape. This toroidal or spherical face enables the lens to be adapted to the user's particular ametropia, so that a progressive multifocal lens is only generally defined by its aspherical surface.

As is well known, an aspherical surface such as the face of a lens is generally defined by the height of all the points on it. Parameters consisting of the minimum and maximum curvatures at each point, or more frequently half of their sum, and their difference, are also employed. The half-sum and difference multiplied by a factor n−1, where n is the refractive index of the lens material, give a value for what is known as the mean sphere (or power) of the lens and the cylinder of the lens.

Families of progressive multifocal lenses are defined in which each lens of a family is characterized by the result of an addition value corresponding to the variation in mean power between the near vision portion and the distance vision portion. More precisely, the addition value, referred to by the letter A, corresponds to the variation in mean power between a point in the distance vision portion and a point in the near vision portion, these points being respectively called the distance vision power control point and the near vision power control point, and which represent the points where the line of sight intersects the lens surface for infinite vision and for reading vision.

Within a a given family of lenses, the power addition value varies from one lens to another within the family between a minimum addition value and a maximum addition value. Usually, the minimum and maximum addition values are respectively 0.5 diopters and 3.5 diopters, the addition value varying in 0.25 diopter steps from one lens to the next within the family.

In order to create progressive multifocal lenses, one generally starts by determining a line referred to as the principal meridian of progression, corresponding to the points at which the spectacle wearer's line of view intersects the lens surface, when the wearer looks at objects at different distances. Following this, the shape of the aspherical surface is defined along this meridian and in the vicinity thereof.

Among known multifocal ophthalmic lenses, there are essentially two types of family of lens. In the first type of family of lenses, the distance between the two abovementioned control points is substantially constant and the slope or gradient of the optical power varies from one lens to another in the family. Such lenses are for example described in French patent 2,058,499 and in the two Certificates of addition thereto 2,079,663 and 2,193,989.

Regarding the second type of family of lenses, the slope or gradient of optical power along the principal meridian of progression is constant and identical for all the lenses of the family, regardless of the addition value of their powers (see Japanese patent 54-85743). In this case, the distance between the said points varies from one lens to the next within the family.

In order to characterize such types of lens, a parameter known as the effective progression length is used. In a coordinate system where the x-axis corresponds to the horizontal axis of the lens and the y-axis corresponds to an axis vertical to the periphery of the lens, the effective progression length is the distance along the y-axis for which a variation in mean power corresponding to at least 85% of the power addition value A is encountered.

Multifocal ophthalmic lenses regardless of their type, inevitably suffer from optical aberrations (astigmatism, distortion, prismatic deviations, etc.) which have a negative effect on visual comfort both under static and dynamic vision conditions.

Furthermore, after a change of lenses, and encountering lenses of a higher power addition value, the wearer of the spectacles usually needs to make an effort to physiologically adapt to them. The time needed for such adaptation can vary from one to several days, depending on the subject.

The applicant has proposed a third type of family of ophthalmic lenses which attempts: to deal with the problem of reducing the effort of physiological adaptation and the time needed to adapt when the wearer changes from a pair of lenses having a first power addition value to a pair of lenses having a second higher power addition value (French patent 2,617,989).

The applicant has also proposed, with a view to better satisfying the visual needs of persons suffering from presbyopia and to improve the comfort of progressive multifocal lenses, to adapt the form or shape of the principal meridian of progression as a function of the power addition value A.

Existing lenses do provide a satisfactory solution to static vision and foveal vision. There is nevertheless room for improvement as regards dynamic vision, in other words vision of objects that move in the field of vision due to their own movement or movement of the wearer of the spectacles. It would be also useful to reduce defects of peripheral vision. One can consider that existing progressive lenses provide quite satisfactory vision when the wearer of spectacles is looking at an object located straight in front of him, and at any distance whatsoever. In this case, the wearer's line of view is precisely along the principal meridian of progression, and the research undertaken by the applicant and disclosed in the above-cited patents does provide a high level of comfort.

Outside the region of the principal meridian of progression, vision with progressive multifocal lenses does present problems, resulting from the aspherical nature of the lenses and in particular, from the fact that the points where the line of view for peripheral vision intersects the right and left lenses do not necessarily follow horizontal and vertical curves which are identical or are at least sufficiently close to rule out all discomfort. It has been found that variations in horizontal curvature did not in fact cause notable discomfort and there was a proposition to limit variations in vertical curvature for points on the lens located along a given y-coordinate. Such differences in curvature lead to vertical prismatic effects which are not equivalent and which have a negative effect on peripheral vision.

More precisely, in French patent 2,193,989 the applicant proposed limiting the variation in vertical curvature between a given point on the lens and the point on the principal meridian of progression having the same y-coordinate, as a function of the value of the lens power addition value. This solution enabled vertical prismatic deviations to be reduced, thus improving progressive lens comfort.

Despite the advantages provided by this solution, wearers of progressive multifocal lens spectacles still experience discomfort with dynamic vision or vision in the lateral portion of the distance and near vision portions.

SUMMARY OF THE INVENTION

The present invention provides a progressive multifocal lens which overcomes the disadvantages of the prior art lenses and which enables dynamic vision and extra-foveal vision to be improved. The lens corresponds in all respects to the research the applicant has already carried out in the area of multifocal lens definition and, in particular, the definition of the principal meridian lines of progression the applicant has proposed.

There is thus provided a progressive multifocal ophthalmic lens comprising an aspherical surface having a mean sphere and a cylinder at every point thereof, said surface comprising a distance vision portion including a control point for distance vision, a near vision portion including a control point for near vision, an intermediate vision portion between said distance vision portion and said near vision portion, a principal meridian of progression passing through the said three portions, the said lens having a power addition value defined as the variation in mean sphere between said distance vision control point on said distance vision portion and said near vision control point on said near vision portion, and in which:

the maximum value of the gradient of the mean sphere of said surface is located at a part of said principal meridian of progression that is situated within said intermediate vision portion, and, over the whole of the aspherical surface of the lens, the ratio of gradient of the cylinder of said surface to said power addition value has a value that is less than a coefficient $K_{c\ max}$ of constant value.

In a preferred embodiment, the principal meridian of progression of the lens consists substantially of three straight line segments comprising a first segment extending substantially vertically from a point at the top of said lens down to a fitting center thereof, a second segment extending from said fitting center obliquely towards the nasal side of the lens, and a third segment starting from the extremity of said second segment and passing through said near vision control point, wherein the gradient of mean sphere of the lens surface has a maximum value along said second segment of said principal meridian of progression.

The effective progression length of the lens is preferably less than or equal to 15 mm.

The cylinder gradient preferably has a maximum value in the lateral portions of the second segment of the principal meridian of progression.

According to one preferred feature, a 0.5 diopter isosphere line of the lens makes an angle of less than 30° with the horizontal axis thereof.

According to another preferred feature, 0.5 diopter isocylinder lines in the vicinity of the distance vision portion of the lens make an angle of less than 30° with the horizontal axis of the lens.

In a preferred embodiment, the ratio of the said maximum value of the gradient of the mean sphere to the power addition value has a value that is less than a coefficient $K_{s\ max}$ which depends on the power addition value, and which is equal to 0.07 mm$^{-1}$ for a power addition value less than or equal to 1, to 0.08 mm$^{-1}$ for an addition value greater than 1 and less than or equal to 2, and to 0.09 mm$^{-1}$ for an addition value greater than 2.

Also, in a preferred embodiment, the cylinder gradient has a maximum value in the lateral areas of the near vision portion situated beyond the 0.5 diopter isocylinder lines, the ratio of said maximum value of said cylinder gradient to the power addition value being less than a coefficient $K_{c\ max\ VP}$ equal to 0.9 mm$^{-1}$.

Other features and advantages of the invention will become more clear from the description which follows of one embodiment of the invention provided by way of example, with reference to the attached drawings.

DETAILED DESCRIPTION OF A PREFERRED EMBODIMENT

FIGS. 1 to 5 show the optical characteristics of various lenses, considering a lens diameter of around 60 mm.

Figure 1:
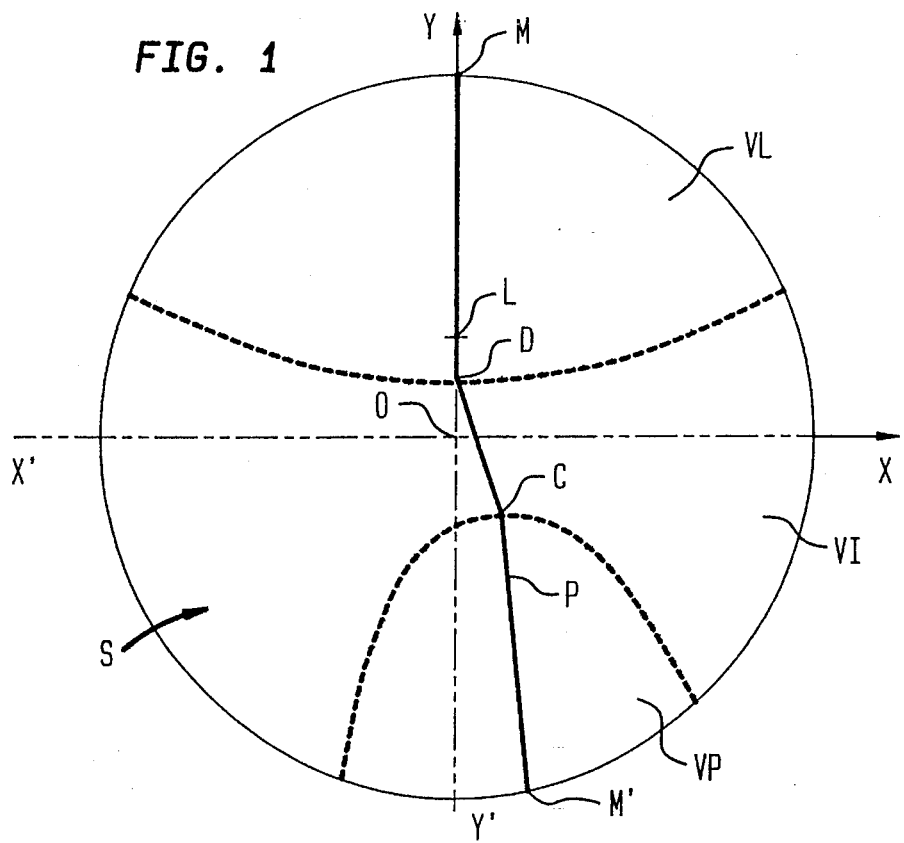
FIG. 1 is a diagrammatical front view of a progressive multifocal lens.

FIG. 1 is a front view of a progressive multifocal lens 1. Lens 1 has an aspherical face shown in FIG. 1, the other face being spherical or toroidal. The principal meridian of progression MM' of the lens is shown as a bold line in FIG. 1, L being the distance vision control point and P being the near vision control point.

Conventionally, lens 1 comprises a distance vision portion VL in its upper region and a near vision portion VP in its lower region, an intermediate zone VI existing between the two. In FIG. 1, the point O is the diametrical center of lens 1.

The principal meridian of progression MM' of the lens is essentially composed of three straight line segments, the first one extending substantially vertically from the top of the lens, passing through the point L, down to a point D, referred to as the fitting center, and located between the distance vision control point L and the diametrical center O. The second segment extends from point D obliquely towards the nasal side of the lens, and the third segment starts from the end C of the second segment and passes through the near vision Control point P. The relative angles of these segments advantageously varies as a function of the power addition value A.

As has been seen, for every point on the aspherical surface, a mean sphere D is defined from the formula:

$$D = \frac{n-1}{2} \left( \frac{1}{R_1} + \frac{1}{R_2} \right)$$

in which:

$R_1$ and $R_2$ are the maximum and minimum radii of curvature expressed in meters, and n is the refractive index of the lens material.

A cylinder C is also defined by means of the formula:

$$C = (n-1) \left| \frac{1}{R_1} - \frac{1}{R_2} \right|$$

In prior art lenses, and in particular those provided by the applicant, vision in the region around the principal meridian of progression is completely satisfactory. In order to improve peripheral vision, the present invention proposes considering the mean sphere gradient and cylinder gradient over the surface of the lens.

Figure 2:
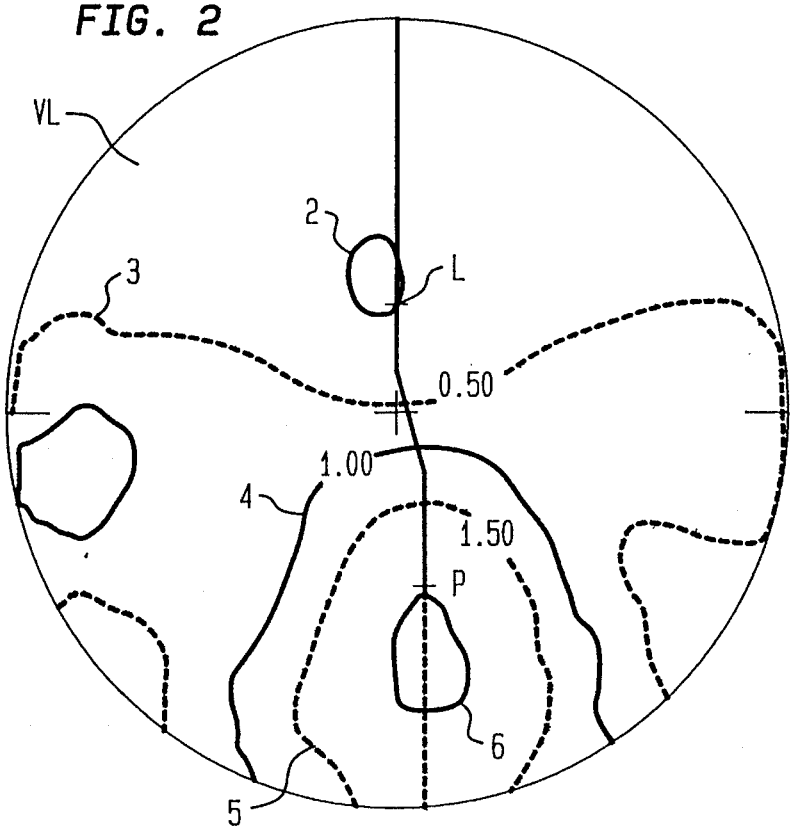
FIG. 2 is a front view of the lens according to the invention showing the principal meridian of progression and lines of mean power level.

FIG. 2 is a front view of a lens according to the invention showing the principal meridian of progression and mean sphere level lines. The lens in FIG. 2 corresponds to a lens of 2 diopters addition value. The known elements shown in FIG. 1 are repeated in FIG. 2. FIG. 2 also includes so-called isosphere (or isopower) lines which are lines joining points on the surface for which the mean sphere has the same value. The isosphere lines in FIG. 2 are lines for which the mean sphere is higher by 0, 0.5, 1, 1.5 or 2 diopters than that of the distance vision control point L. Isosphere line 2 passes through the near vision point and is made up by points having the same mean sphere as point L. The line bearing reference 3 joins points having a mean sphere that is 0.5 diopters higher than that of point L and substantially represents the border between the distance vision portion and the intermediate portion. Line 4 is a mean sphere line that is 1 diopter higher than the means sphere value of point L. The line identified by reference 5 joining points having a mean sphere 1.5 diopters higher can be more or less considered as being the border between the intermediate region and the near vision region.

As can be seen in FIG. 2, the isosphere lines 2, 3, 4, 5 and 6 are closest together in the intermediate vision region, and more precisely, in the middle portion of the intermediate segment DC of the principal meridian of progression which corresponds more or less to the effective progression length. This means that the mean sphere is changing the most rapidly in this region, or, expressed in other terms, that the mean sphere (or power) gradient has a maximum value there. Thus, according to the invention, visual comfort is at a maximum in the distance and near vision regions in which the variation in mean sphere is very small; in the lateral portions of the intermediate vision region, the isosphere lines are close together but substantially horizontal, and peripheral vision remains comfortable; in particular, ease of dynamic vision is preserved. Furthermore, the invention enables extensive near and distance vision regions to be provided.

According to the invention the mean sphere gradient in the intermediate vision region is a function of the power addition value and is preferably a linear function thereof, the effective progression length of the principal meridian being less than or equal to 15 mm.

Figure 3:
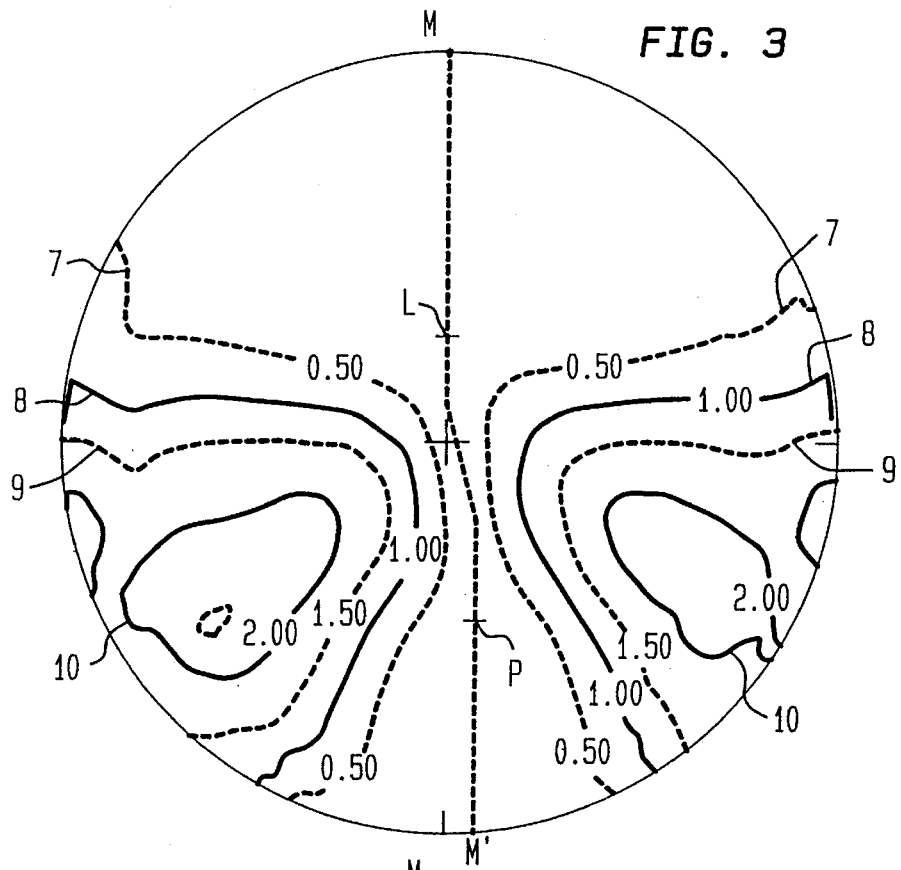
FIG. 3 is a front view of a lens according to the invention showing the principal meridian of progression and cylinder level (isoastigmatism) lines.

FIG. 3 is a front view of a lens according to the invention, showing the principal meridian of progression and lines of identical cylinder (astigmatism) level. On FIG. 3, like in FIG. 2, the known elements shown in FIG. 1 are reproduced. FIG. 3 includes so-called iso-cylinder lines, following the same principle as that explained with reference to FIG. 2. Lines 7, 8, 9 and 10 are cylinder lines respectively equal to 0.5, 1, 1.5 and 2 diopters. Lines 3 and 7 in FIGS. 2 and 3 define an extensive distance vision region, which ensures comfortable peripheral and dynamic vision.

In accordance with the invention, progressive multifocal lens wearer comfort is increased if limitation to cylinder variations at the lens surface is applied. Preferably, the maximum variation in cylinder per millimeter, in other words the cylinder gradient has a maximum value which is a linear function of the power addition value. For each lens having a power addition value A, within given family of lenses, a maximum cylinder gradient $P_{MC}$ can be defined equal to:

$$P_{MC} = k_{c\ max} \cdot A$$

in which:

A is the power addition value, $k_{c\ max}$ is a constant coefficient, equal for example to 0.165 mm$^{-1}$.

Advantageously, the maximum value for cylinder gradient is located in the lateral areas of the intermediate vision region, in other words around the middle portion of the principal meridian of progression.

Furthermore, the cylinder gradient has a maximum value in the lateral areas of the near vision region, in other words on both sides thereof beyond the 0.5 diopter isocylinder lines, that is distinctly lower than the maximum value $P_{MC}$.

Thus, according to the invention, when the mean sphere gradient is at its maximum on the effective progression length DC of the principal meridian of progression, and when the cylinder gradient has a maximum value $P_{MC}$ in the lateral portions of the intermediate region, the wearer of the progressive lenses experiences minimal disturbance to peripheral vision and dynamic vision. Deformation of objects in the lateral areas, and in particular around the near vision region, are minimal.

As can be seen in FIGS. 2 and 3, the near vision region, substantially defined by the 0.5 diopter isosphere and iso-cylinder lines covers a region extending over a wide zone on each side of the principal meridian of progression. In the upper portion of the lens, the cylinder level line and mean sphere line are substantially horizontal. The wearer of the lenses can thus avail of a distance vision lateral sweep facility without significant deformation occurring, thus ensuring considerable comfort for dynamic and peripheral vision. As can be seen on FIGS. 2 and 3, the 0.5 diopter isocylinder and isosphere lines make an angle of less than 30° with the horizontal, this angle being preferably around 10°.

In the lateral portions of the near vision portion, variations in cylinder, as has been seen, are limited. Moreover, mean sphere variations are also advantageously limited. As above, these variations are linear functions of the power addition value. The table below gives, for various values of power addition value A, values for coefficients $k_s$ and $k_{c\ max\ VP}$ Coefficient $k_{s\ max}$ gives the maximal value for the ratio of the mean sphere gradient along portion DC to the addition A; coefficient $k_{c\ max\ VP}$ gives the maximal value for the ratio of the cylinder gradient to the addition A in the lateral portions of the near vision portion beyond the 0.5 diopter isocylinder lines.

| A (diopters) | $k_s$ (mm$^{-1}$) | $k_{c\ max\ VP}$ (mm$^{-1}$) |
|---|---|---|
| 1 | 0.07 | 0.085 |
| 1.5 | 0.08 | 0.085 |
| 2 | 0.08 | 0.085 |
| 2.5 | 0.09 | 0.09 |
| 3 | 0.09 | 0.09 |

Maximum values for the ratio of mean square gradient to addition and for the ratio of cylinder gradient to addition, as shown in the table above, ensure minimal disturbance in the lateral portions of the intermediate vision and near vision portions. The wearer of the lenses thus not only enjoys pleasant peripheral vision in the distance vision region, but also experiences comfortable peripheral and dynamic vision in the two other regions of vision.

Figure 4:
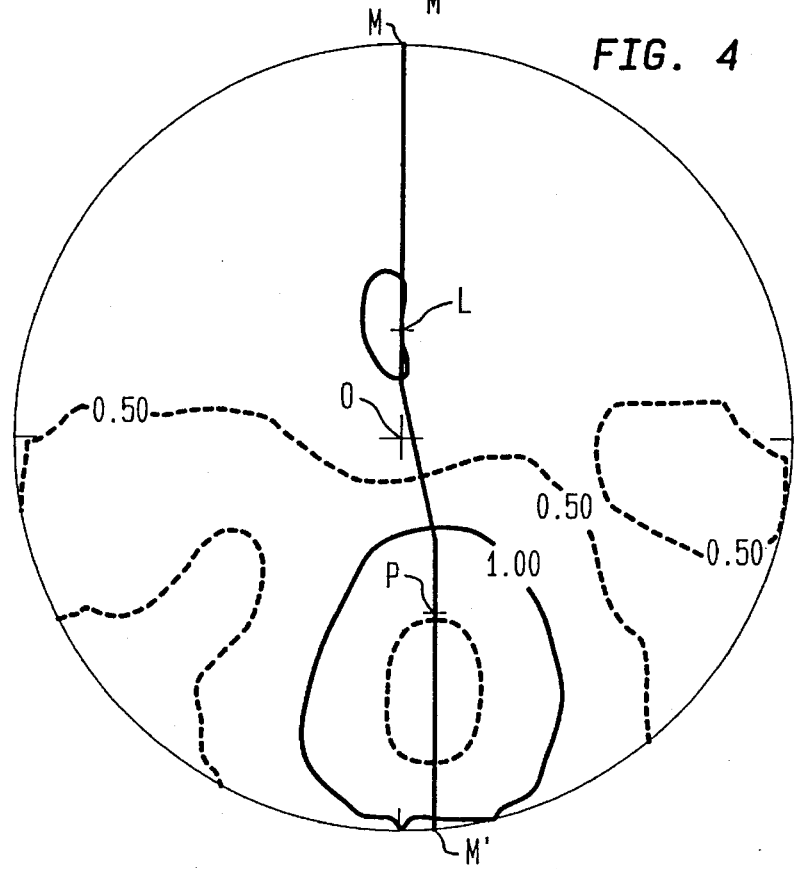
FIG. 4 is a view similar to FIG. 2, with a different power addition value.
Figure 5:
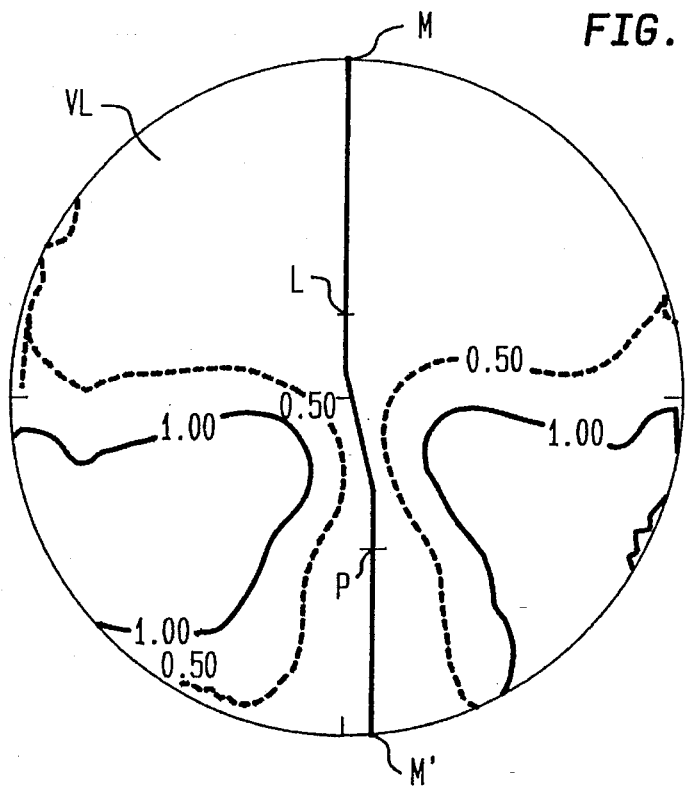
FIG. 5 is a view similar to FIG. 3, but applying to the lens in FIG. 4.

FIGS. 4 and 5 represent, in a similar fashion to FIGS. 2 and 3, the isosphere and isocylinder lines for a power addition value of 1.50 diopters.

Figure 6:
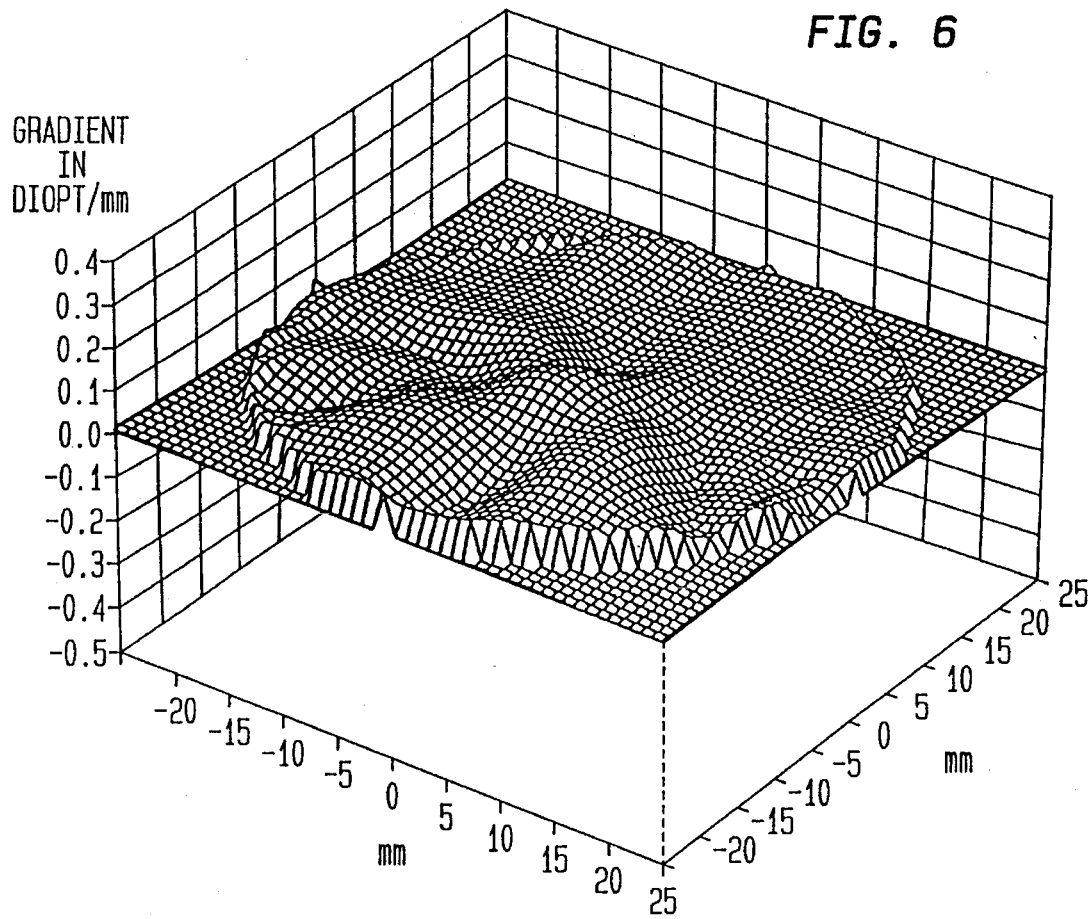
FIG. 6 is a three-dimensional representation of the mean sphere gradient of the lens in FIG. 4.
Figure 7:
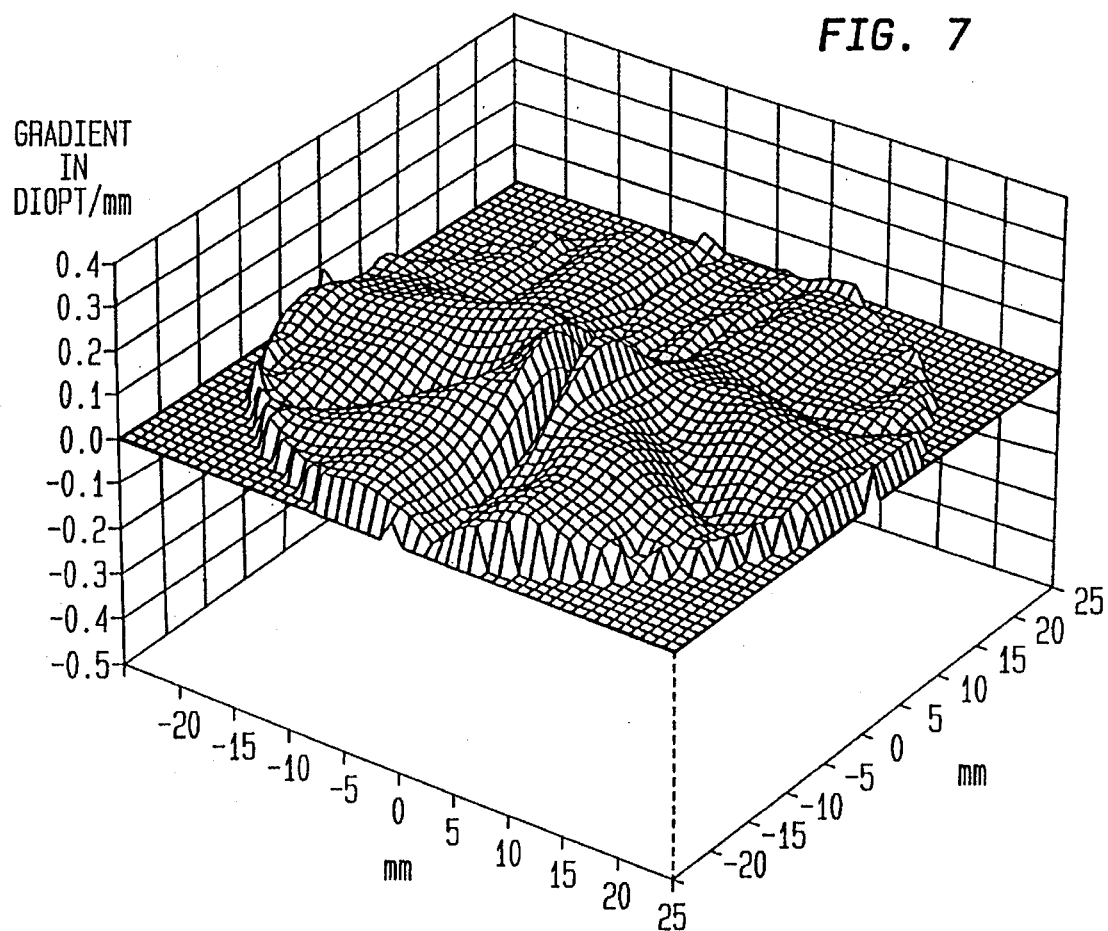
FIG. 7 is a three-dimensional representation of the cylinder gradient for the lens in FIG. 4.

FIGS. 6 and 7 are a three-dimensional representation of the mean sphere and cylinder gradients of the lens shown in FIGS. 4 and 5. It can be clearly seen in FIGS. 6 and 7 that the mean sphere and cylinder gradients are limited, that the maximum value of cylinder gradient is of the order of 0.23 diopters per millimeter, and that the maximum value of mean sphere gradient is of the order of 0.13 diopters per millimeter. As the power addition value is 1.50 diopters, the maximum value of the ratio of the gradient of the cylinder of said surface to said power addition value is equal to 0.153 and is distinctly lower, in accordance with the invention, than the coefficient $K_{c\ max} = -0.165$ mm$^{-1}$.

Figure 8:
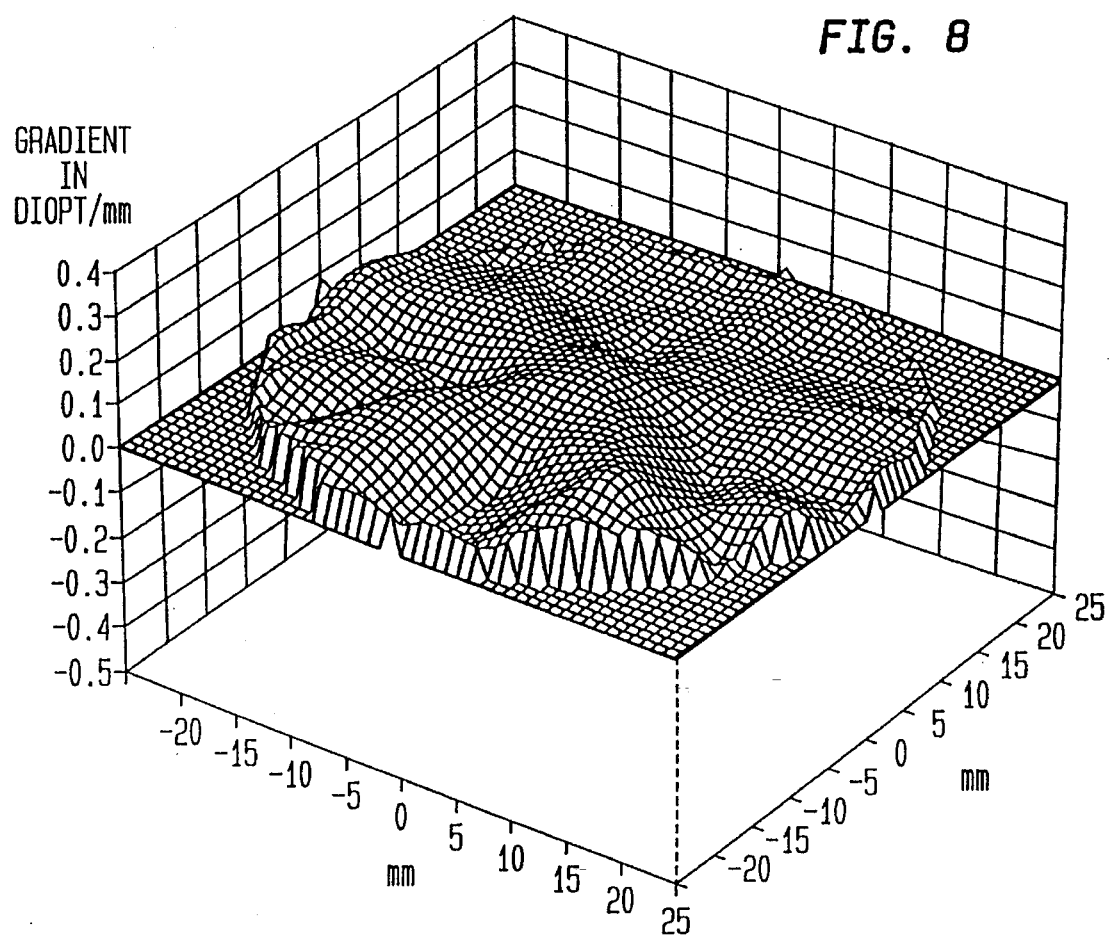
FIG. 8 is a three-dimensional representation of the mean sphere gradient for the lens in FIG. 2.
Figure 9:
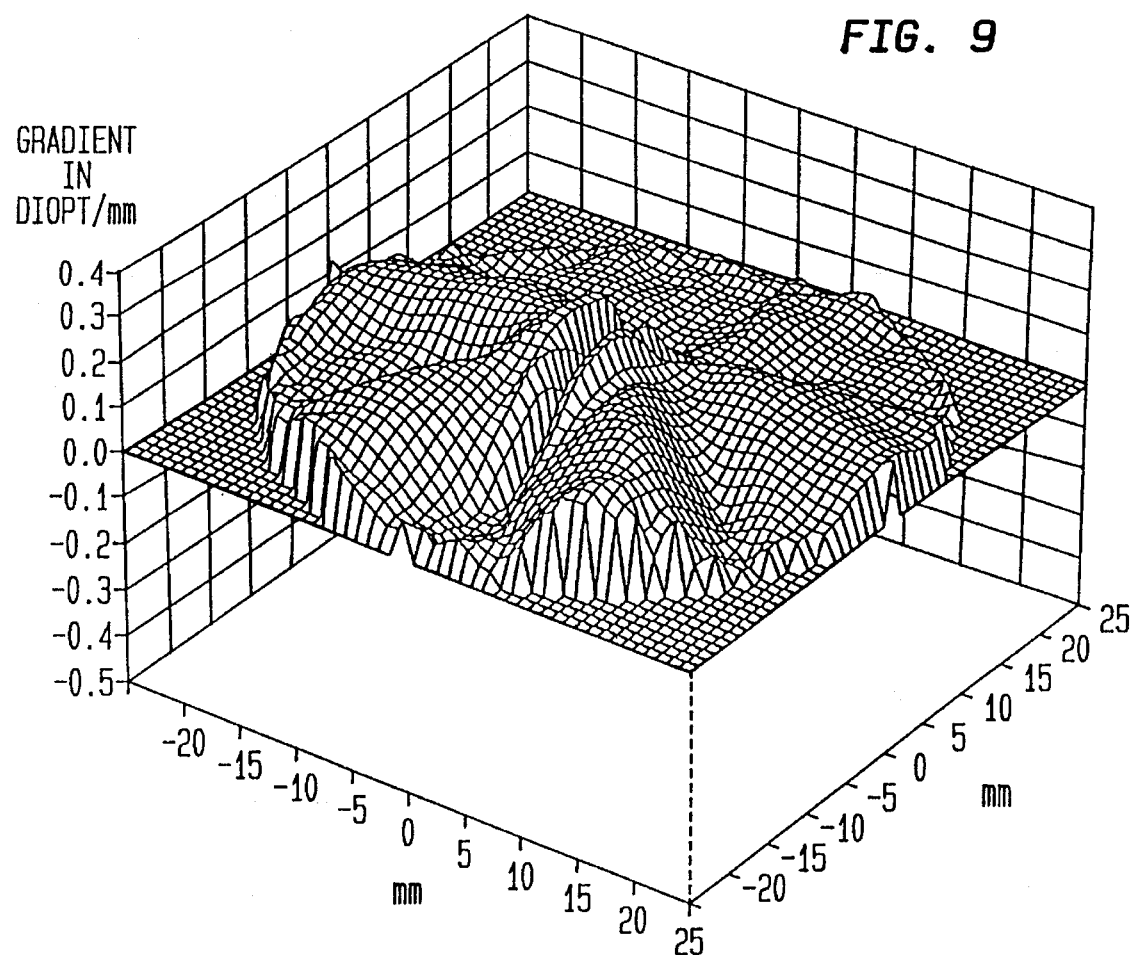
FIG. 9 is a three-dimensional representation of the cylinder gradient for the lens in FIG. 2.

FIGS. 8 and 9 are a three-dimensional representation of the mean sphere and cylinder gradients of the lens shown in FIGS. 2 and 3. It can be clearly seen in FIGS. 8 and 9 that the mean sphere and cylinder gradients are limited, that the maximum value of cylinder gradient is of the order of 0.25 diopters per millimeter, and that the maximum value of mean sphere gradient is of the order of 0.17 diopters per millimeter. As the power addition value is 2 diopters, the maximum value of the ratio of the gradient of the cylinder of said surface to said power addition value is equal to 0.125 and is, in accordance with the invention, distinctly less than the coefficient $K_{c\ max} -0.165$ mm$^{31\ 1}$.

Mean sphere gradient is at a maximum value around the intermediate vision region. It is very small in the distance vision region over a very extensive area. It is also very small in the near vision region.

Cylinder gradient also exhibits zones of only small variation corresponding to the distance vision region and the near vision region.

The invention thus ensures comfortable vision not only along the principal meridian of progression but also in lateral regions, and ensures good dynamic and peripheral vision.

It should be also noted that, in accordance with the invention and as mentioned above, a very extensive distance vision field is provided, this occupying the major portion of the upper half of the lens, and it should be further noted, with reference to FIGS. 3 and 5, that the near vision field is also very extensive. The table below gives the width of the near vision field measured horizontally at both sides of point P-14 mm along the y-axis with respect to the diametrical center O of the lens up to the 0.5 diopter isocylinder line, in millimeters, as a function of the power addition value.

| A | field width VP at point P in mm |
|---|---|
| 1 | 15 |
| 1.5 | 12 |
| 2.0 | 11 |
| 2.5 | 9 |
| 3 | 9 |

Obviously, the present invention is not limited to the embodiment just described and illustrated, but may undergo various modifications available to those skilled in the art without however departing from the scope of the invention as defined.

What is claimed is:

1. A progressive multifocal ophthalmic lens comprising an aspherical surface having a mean sphere and a cylinder at every point thereof, said surface comprising:

a distance vision portion including a control point for distance vision, a near vision portion including a control point for near vision, an intermediate vision portion between said distance vision portion and said near vision portion, a principal meridian of progression passing through the said three portions, the said lens has a power additional value defined as the variation in mean sphere between said distance vision control point on said distance vision portion and said near vision control point on said near vision portion, and in which:

the maximum value of the gradient of the mean sphere of said surface is located at a part of said principal meridian of progression that is situated within said intermediate vision portion, and, over the whole of said aspherical surface of the lens, the ratio of the gradient of the cylinder of said surface to said power addition value has a value that is less than a coefficient $k_{cmax}$ equal to 0.165 mm$^{-1}$.

2. A lens according to claim 1, wherein the said principal meridian of progression of said lens consists substantially of three straight line segments comprising:

a first segment extending substantially vertically from a point at the top of said lens down to a fitting center thereof, a second segment extending from said fitting center obliquely towards the nasal side of said lens, and a third segment starting from the extremity of said second segment and passing through said near vision control point, and wherein the gradient of mean sphere of said surface has a maximum value along said second segment of said principal meridian of progression.

3. A lens according to claim 1, having an effective progression length less than or equal to 15 mm.

4. A lens according to claim 2 or 3, wherein said cylinder gradient has a maximum value in regions situated laterally of said second segment of said principal meridian of progression located in said intermediate vision portion.

5. A lens according to claim 1, wherein a 0.5 diopter isosphere line of said surface makes an angle of less than 30° with the horizontal axis of said lens.

6. A lens according to claim 1, wherein 0.5 diopter isocylinder lines in the vicinity of said distance vision portion make an angle of less than 30° with the horizontal axis of said lens.

7. A lens according to claim 1 wherein the ratio of the said maximum value of the gradient of the mean sphere to said power addition value has a value that is less than coefficient $k_{s\ max}$ which depends on the power addition value and which is equal to 0.07 mm$^{-1}$ for a power addition value less than or equal to 1, to 0.08 mm$^{-1}$ for a power addition value greater than 1 and less than or equal to 2, and to 0.09 mm$^{-1}$ for an addition value greater than 2.

8. A lens according to claim 1, wherein said cylinder gradient has a maximum value in lateral regions, situated beyond 0.5 diopter isocylinder lines, of said near vision portion of said surface, the ratio of said maximum value of said cylinder gradient to said power addition value being less than a coefficient $k_{c\ max\ VP}$ equal to 0.09 mm$^{-1}$.

9. A progressive multifocal ophthalmic lens comprising an aspherical surface having a mean sphere and a cylinder at every point thereof, said surface comprising:

a distance vision portion including a control point for distance vision, a near vision portion including a control point for near vision, an intermediate vision portion between said distance vision portion and said near vision portion, a principal meridian of progression passing through the said three portions and consisting substantially of three straight line segments comprising:

a first segment extending substantially vertically from a point at the top of said lens down to a fitting center thereof, a second segment extending from said fitting center obliquely toward the nasal side of said lens, and a third segment starting from the extremity of said second segment and passing through said near vision control point, the said lens having a power addition value defined as the variation in mean sphere between said distance vision control point on said distance vision portion and said near vision control point on said near vision portion, and in which:

the maximum value of the gradient of the mean sphere of said surface is located along said second segment of said principal meridian of progression that is situated within said intermediate vision portion, and, over the whole of said aspherical surface of the lens, the ratio of the gradient of the cylinder of said surface to said power addition value has a value that is less than a coefficient $k_{c\ max}$ equal to 0.165 mm$^{-1}$.

10. A lens according to claim 9, having an effective progression length less than or equal to 15 mm.

11. A lens according to claim 10, wherein said cylinder gradient has a maximum value in regions situated laterally of said second segment of said principal meridian of progression located in said intermediate vision portion.

12. A lens according to claim 9, wherein a 0.5 diopter isosphere line of said surface makes an angle of less than 30° with the horizontal axis of said lens.

13. A lens according to claim 9, wherein 0.5 diopter isocylinder lines in the vicinity of said distance vision portion make an angle of less than 30° with the horizontal axis of said lens.

14. A lens according to claim 9 wherein the ratio of the said maximum value of gradient of the mean sphere to said power addition value has a value that is less than a coefficient $k_{s\ max}$ which depends on the power addition value and which is equal to 0.07 mm$^{-1}$ for a power addition value less than or equal to 1, to 0.08 mm$^{-1}$ for a power addition value greater than 1 and less than or equal to 2, and to 0.09 mm$^{-1}$ for an addition value greater than 2.

15. A lens according to claim 14, wherein said cylinder gradient has a maximum value in lateral regions, situated beyond 0.5 diopter isocylinder lines, of said near vision portion of said surface, said maximum value being equal to the product obtained by multiplying said power addition value by a coefficient $k_{c\ max\ VP}$, said coefficient having a value of 0.09 mm$^{-1}$.

* * * * *